United States Patent
Swiszcz (10) Patent No.: US 9,511,266 B2
(45) Date of Patent: Dec. 6, 2016

(54) LEATHER GAME BALL WITH TEXTURED GRAPHIC OR STRIPE

(71) Applicant: Louis S. Swiszcz, Chicopee, MA (US)

(72) Inventor: Louis S. Swiszcz, Chicopee, MA (US)

(73) Assignee: PSI 91, Inc., Springfield, MA (US)

( * ) Notice: Subject to any disclaimer, the term of this patent is extended or adjusted under 35 U.S.C. 154(b) by 227 days.

(21) Appl. No.: 14/043,067

(22) Filed: Oct. 1, 2013

(65) Prior Publication Data

US 2014/0100067 A1    Apr. 10, 2014

Related U.S. Application Data (60) Provisional application No. 61/710,235, filed on Oct. 5, 2012, provisional application No. 61/861,512, filed on Aug. 2, 2013.

(51) Int. Cl.
    B29C 59/02    (2006.01)
    A63B 41/08    (2006.01)
    A63B 45/02    (2006.01)
    A63B 43/00    (2006.01)

(52) U.S. Cl.
    CPC ............ *A63B 41/08* (2013.01); *A63B 45/02* (2013.01); *B29C 59/02* (2013.01); *A63B 43/008* (2013.01); *A63B 2243/007* (2013.01); *Y10T 156/1039* (2015.01); *Y10T 156/1041* (2015.01)

(58) Field of Classification Search
    None
    See application file for complete search history.

(56) References Cited

U.S. PATENT DOCUMENTS

| | | | | |
|---|---|---|---|---|
| 1,573,251 A | * | 2/1926 | Knoll | B05D 5/06 427/261 |
| 1,639,332 A | * | 8/1927 | Edwards | A43D 95/14 101/32 |
| 1,663,688 A | * | 3/1928 | Edwards | A43D 8/06 101/28 |
| 1,843,738 A | * | 2/1932 | Schubert | B44C 1/16 8/436 |
| 1,969,972 A | * | 8/1934 | Edwards | A43D 8/22 101/28 |
| 2,002,792 A | * | 5/1935 | Sart | B44C 1/24 428/15 |
| 2,029,377 A | * | 2/1936 | Kaplan | B44C 1/1712 156/237 |
| 2,047,373 A | * | 7/1936 | Kingsley | B44B 5/0023 101/391 |
| 2,130,188 A | * | 9/1938 | Kauffman | A43D 95/14 101/297 |

(Continued)

FOREIGN PATENT DOCUMENTS

GB    191419451    * 11/1915

*Primary Examiner* — Edmund Lee
(74) *Attorney, Agent, or Firm* — Richard M. Klein; Fay Sharpe LLP (57) ABSTRACT

The present disclosure relates to a game ball and methods for creating a textured graphic or stripe on the game ball, specifically on a panel of natural full-grain leather. Briefly, the full-grain leather panel is stamped with a textured plate to form a textured area. A graphic or stripe is then applied on the textured area. The resulting game ball has textured graphics or stripes with improved wear and good grip and handling characteristics.

7 Claims, 13 Drawing Sheets

(56) References Cited

U.S. PATENT DOCUMENTS

| | | | | |
|---|---|---|---|---|
| 2,130,222 | A | * | 9/1938 | Barrett ............... C14B 1/56 |
| | | | | 428/15 |
| 2,241,502 | A | * | 5/1941 | Brophy ............. A43B 1/0072 |
| | | | | 12/146 L |
| 3,759,172 | A | * | 9/1973 | Conklin ............... B44B 7/00 |
| | | | | 101/27 |
| 4,928,962 | A | * | 5/1990 | Finley ............... A63B 41/08 |
| | | | | 473/596 |
| 5,298,031 | A | * | 3/1994 | Gabay ............... D06C 23/04 |
| | | | | 8/471 |
| 5,320,345 | A | | 6/1994 | Lai et al. |
| 5,669,838 | A | | 9/1997 | Kennedy et al. |
| 5,931,752 | A | | 8/1999 | Guenther et al. |
| 7,029,407 | B2 | * | 4/2006 | Lee ..................... A63B 41/08 |
| | | | | 473/597 |
| 2002/0121331 | A1 | * | 9/2002 | Gerresheim ......... B29C 73/163 |
| | | | | 156/115 |
| 2002/0121333 | A1 | * | 9/2002 | Sofer ................. B41M 5/0256 |
| | | | | 156/240 |
| 2009/0054177 | A1 | | 2/2009 | Simonds et al. |
| 2010/0317471 | A1 | | 12/2010 | Geisendorfer |

\* cited by examiner

LEATHER GAME BALL WITH TEXTURED GRAPHIC OR STRIPE

CROSS-REFERENCE TO RELATED APPLICATIONS

This application claims priority to U.S. Provisional Patent Application Ser. No. 61/710,235, filed on Oct. 5, 2012, and to U.S. Provisional Patent Application Ser. No. 61/861,512, filed on Aug. 2, 2013. The entirety of these applications is hereby fully incorporated by reference.

BACKGROUND

The present disclosure relates generally to leather game balls having improved handling and/or playability characteristics. More particularly, this disclosure relates to methods of applying textured graphics or striping material onto a panel of natural leather and the resulting balls produced thereby. Such methods are particularly useful for marking the covers of certain inflated game balls or sportsballs, such as those used for throwing and kicking in the games of rugby and American football or Canadian football, which have logos and/or stripes, without reducing (and possibly improving) the overall grippability of the balls.

In this regard, a football or rugby ball has a generally prolate spheroid shape (i.e. egg-shaped) with lacing on one side of the ball. The specific size, shape, and construction of the ball differ depending upon league rules and regulations. Also, the balls are designed to meet certain specifications and comprise different components or parts. For example, the National Collegiate Athletic Association (NCAA) requires that all footballs used for gameplay are marked with two 1-inch white stripes covering the top panels of the ball. These stripes are located about 3 inches from the end of the ball.

When used in play, a football and/or rugby ball is contacted by players in a variety of different ways and using a variety of techniques. For example, a football player can carry, hold, throw, and/or catch the game ball frequently during the course of a game.

The feel or touch of the game ball can affect the tempo and result of the game. For example, if the surface of a game ball is too smooth, it may be very difficult for a receiver to catch a football or for a running back to maintain the ball in his hands while running. On the other hand, if the game ball has a surface that is too sticky, the football quarterback may have difficulty throwing the football with the desired degree of precision. This is especially true during play in inclement weather conditions.

Leather is a material created through the tanning of hides and skins of animals, frequently cattle hide. The tanning process converts the putrescible skin or hide into a durable, long-lasting and versatile natural material suitable for various uses. Generally, four different types of leather exist having different characteristics, i.e. full-grain, top-grain, corrected grain, and split grain.

Full-grain leather is a common material used to form the cover of game balls such as footballs. In this regard, full-grain leather is formed from animal hide where only the hair has been removed, and the natural grain (texture) has been left on. Full-grain leather is thick. In contrast, with top-grain leather the natural grain has been removed. Full-grain leather is very desirable to use because of its durability and minimal chemical treatment. However, full-grain leather has a very hard/rigid topcoat texture and it is difficult to stamp, texturize, and/or finish.

The grip of the game ball is of course heavily affected by the surface of the game ball. In this regard, full-grain leather has a "pebbly" texture which enhances the gripability of the surface. However, to apply brand logos, model numbers, text, numbers, and other graphics upon a game ball, the pebbles on one or more of the leather panels are normally flattened by stamping to create large flat areas on the surface of the game ball. The graphics are then applied to those flat areas by transferring a thin layer of paint, dye, or other coating to the flattened surface. However, these flat areas are slippery. It is difficult to catch and grip the game ball within these slippery flat spots/areas.

Application of stripes differ from the application of other graphics in that stripes are usually painted directly onto the leather, or are separately made and then placed in recesses on the leather panel. Paint is not durable, and often chips or flakes after little use. Stripes usually have a different feel as well.

As a result of these inconsistent surface characteristics, different methods have been tried to improve the grip of surfaces of the game ball having graphics or stripes applied to them. Those methods have included matte finish inks, cheese cloth mesh stamping, and printing with transfer inks over the pebbles (i.e. leaving the raised pebbles and applying ink). These methods have resulted in very poor grip capabilities, slippery areas and poor durability of the graphics (printing over pebbles has very poor coverage/abrasion).

It would be desirable to provide methods of applying graphics or stripes to full-grain leather that improve grip.

SUMMARY

The present disclosure relates to a game ball and methods for creating a textured pattern within stamped areas on a full-grain leather panel. Graphics or stripes can then be applied to these textured areas. The resulting game ball has improved/more uniform tackiness, grip, or texture over the cover of the game ball. The graphics or stripes applied to the panel also have improved wear characteristics.

Generally, an area on the full-grain leather panel is designated to which a graphic or stripe is to be applied. The area is stamped with a textured stamping plate that creates a non-flat or raised area. The texture can have any one of many different shapes, such as rounded hemisphere, diamond, square, cross hatch pattern, or combinations thereof; or could be a customized shape, e.g. a team or brand logo. The graphic or stripe is then applied to this stamped area, for example using transfer foil inks, foils, or paints. The texture in the stamped area is different from the original grain of the full-grain leather panel. This provides an improved grip and eliminates the smooth or flat slippery surfaces previously required for applying graphics or stripes, making it much easier to grip, catch, and hold the ball. This provides an overall improved feel and playability to the game ball as well.

The leather panels having the textured graphics or stripes are especially suitable for use on an inflatable game ball that has an interior inflatable bladder. The leather panels are used as a cover layer upon the bladder. In specific embodiments, the game ball is an American football.

Disclosed in various embodiments are methods for applying a textured graphic or stripe upon a panel of full-grain leather. The full-grain leather panel is stamped with a textured stamping plate to form a textured area on the leather panel. A transfer film is placed over the textured area, the transfer film having a graphic or stripe. The graphic is then applied into the textured area to form the textured graphic or stripe.

The methods may further comprise placing an oil absorbing paper between the textured stamping plate and the full-grain leather panel prior to stamping.

The textured area after stamping may have a textured pattern that is different from the natural texture of the full-grain leather panel outside the stamped area. The stamped area may be formed from protrusions having a shape selected from the group consisting of a rounded hemisphere, diamond, square, cross hatch pattern, or combinations thereof; or could be a customized shape, e.g. a team or brand logo.

The graphic or stripe on the transfer film can comprise an ink, foil, or paint. A stripe may be a plurality of lines of varying thickness or color. A graphic may be a logo, name, symbol, emblem, brand, or sign.

Also disclosed in embodiments is a full-grain leather game ball with a textured graphic or stripe. The game ball comprises a bladder; and a full-grain leather cover layer surrounding the bladder formed from at least one full-grain leather panel having a natural area and a textured graphic or stripe in a stamped area. The stamped area has a texture that is different from the natural texture of the leather game ball.

The textured area may be formed from protrusions having a shape selected from the group consisting of a hemisphere, diamond, cross hatch, diamond, square, or combinations thereof. The graphic may be a logo, name, symbol, emblem, brand, or sign.

Alternatively, a graphic or stripe is applied to an area on the full-grain leather panel. The area is then stamped with a textured stamping plate to obtain a non-flat or raised area that has a texture. The texture in the stamped area is different from the original grain of the full-grain leather panel.

These and other non-limiting characteristics are more particularly described below.

DESCRIPTION OF THE DRAWINGS

The following is a brief description of the drawings, which are presented for the purpose of illustrating the exemplary embodiments disclosed herein and not for the purpose of limiting the same.

DETAILED DESCRIPTION

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The terms "stamp" and "texture", and their variations, are used interchangeably herein. In this regard, stamping refers to a particular process for creating a design that stands out in relief, while such a design can be referred to as a textured design.

The present disclosure relates to methods of forming a textured graphic on a full-grain leather panel. Usually for graphics, the original natural texture of the full-grain leather is removed by flattening to create a flat area where a graphic can be applied. However, when the panel is applied to a game ball, this results in a ball having uneven grip characteristics. The original natural texture has a much different feel than the flat area of the graphic, which can be slippery. In addition, the applied graphic has poor durability. In the methods of the present disclosure, rather than creating a flat area, a textured stamping plate is used to create a textured area on the full-grain leather panel. The texture within the stamped area is different from the original texture of the full-grain leather panel. The graphic is then applied to this textured area.

These methods can also be used to form textured stripes on a full-grain leather panel.

Figure 1:
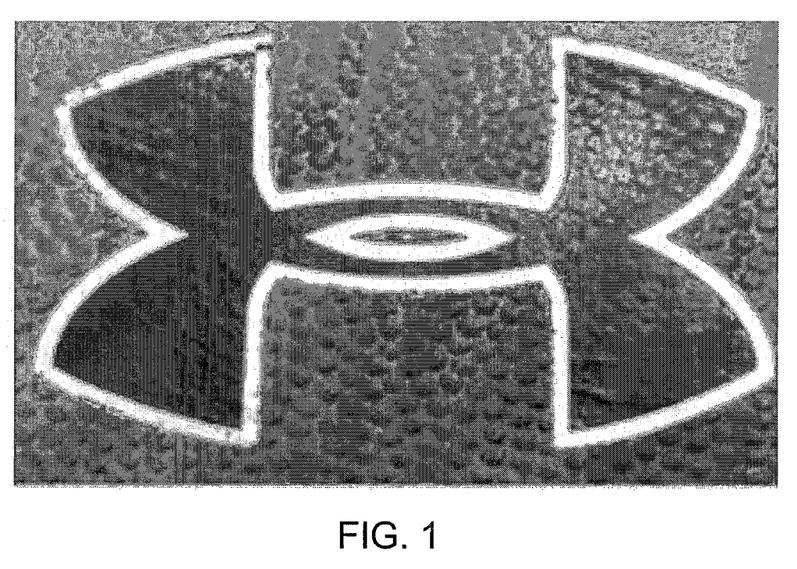
FIG. 1 is a picture showing a leather panel with a graphic prepared according to conventional methods and having a slippery surface.
Figure 2:
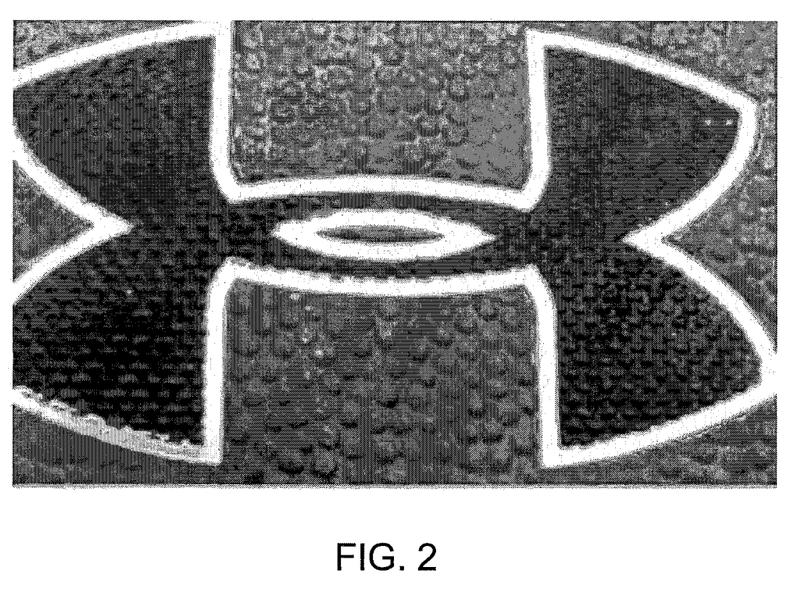
FIG. 2 is a picture showing a leather panel with a textured graphic prepared according to the present disclosure and having a textured surface with enhanced durability and good grip properties.

FIG. 1 and FIG. 2 illustrate the different results that arise when the methods of the present disclosure are used. FIG. 1 is a panel with graphics applied using conventional methods, while FIG. 2 is a panel with graphics applied using the methods of the present disclosure. In the stamped area with the logo seen in FIG. 1, the stamped area is flat and without texture. In FIG. 2, protrusions are seen in the stamped area that creates a textured pattern with better durability and grip characteristics.

Figure 3:
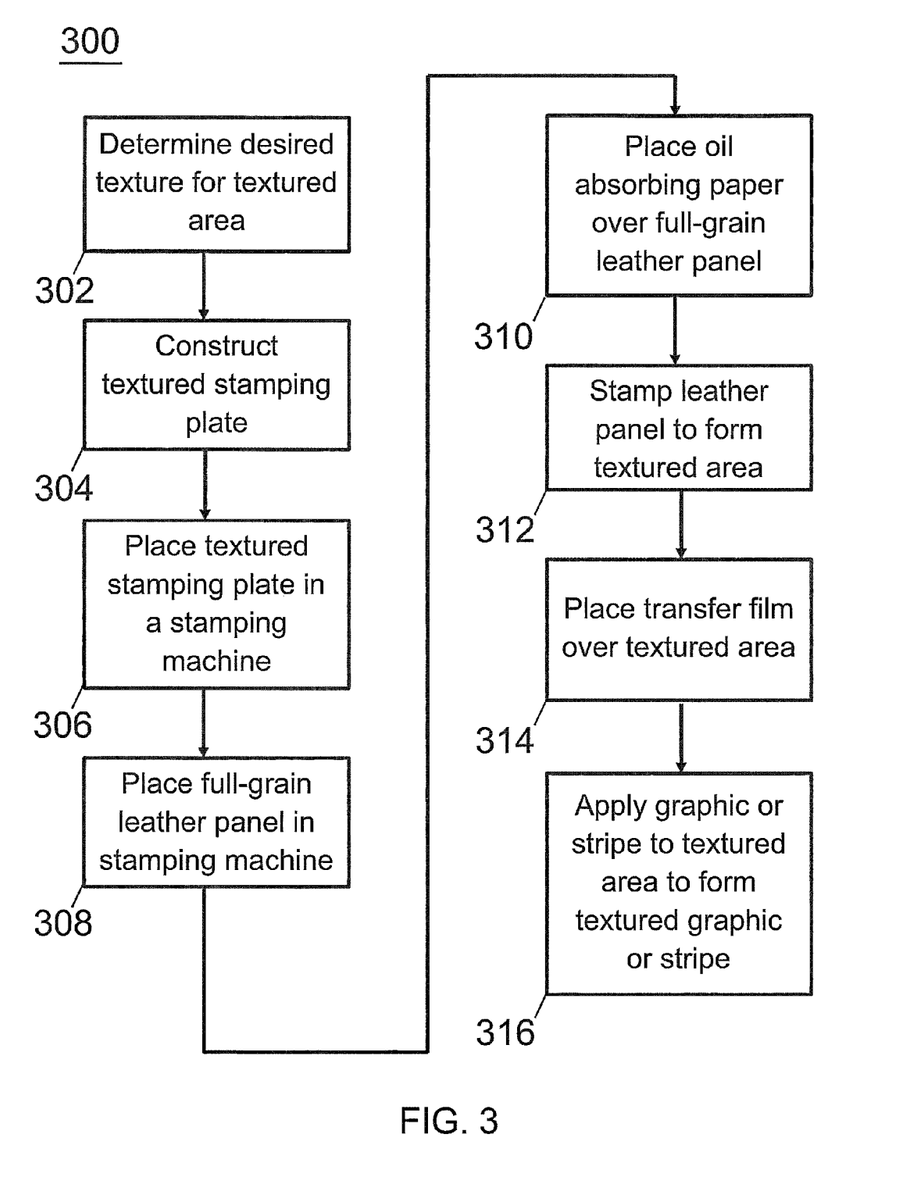
FIG. 3 is a flowchart showing several steps associated with the methods of the present disclosure.

FIG. 3 is a flow chart illustrating steps that can be included in the methods of the present disclosure. The flowchart 300 begins with step 302, in which the desired texture of the stamped area is determined. The texture in the stamped area can be a textured pattern formed from protrusions that are created by the use of the textured stamping plate. For example, the protrusions may have a shape selected from the group consisting of a rounded hemisphere, diamond, square, cross hatch pattern, or combinations thereof; or could be a customized shape, e.g. a team or brand logo.

Figure 4:
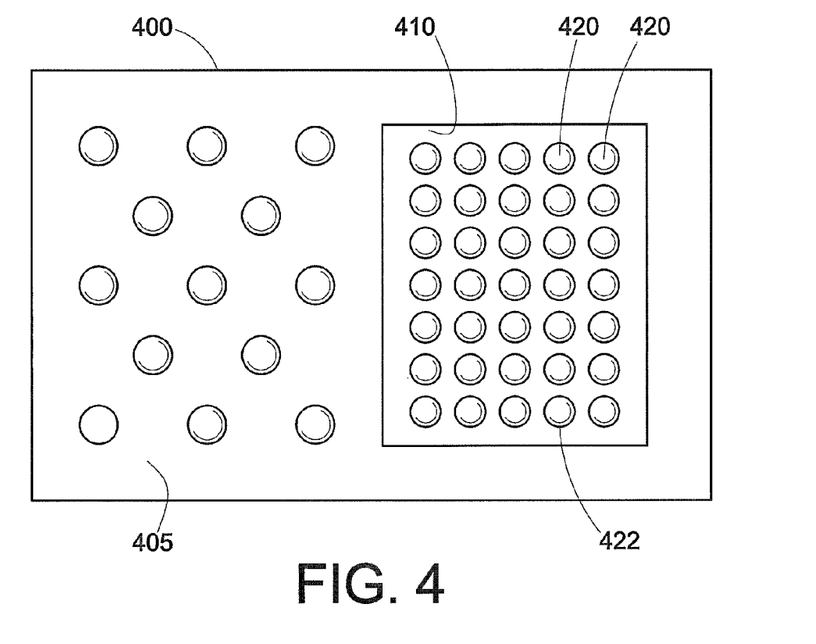
FIG. 4 is a plan view showing a leather panel with a textured area of hemispherical protrusions.
Figure 5:
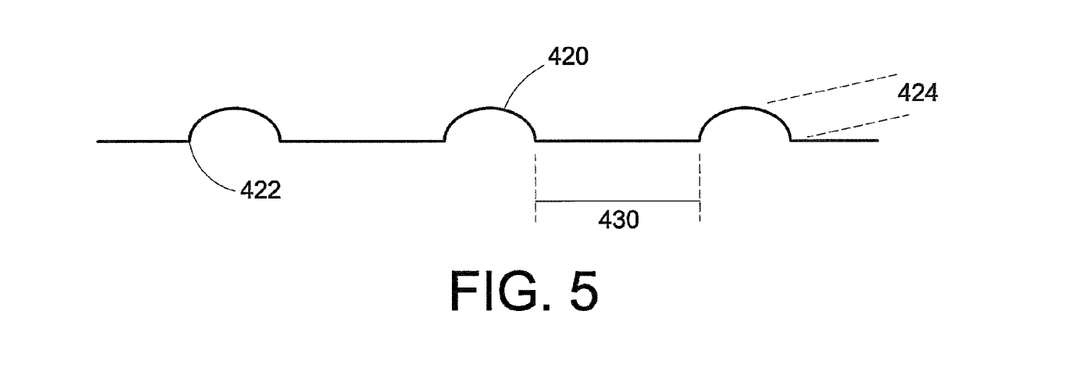
FIG. 5 is an enlarged cross-sectional view of some hemispherical protrusions of FIG. 4.

FIG. 4 is a plan view showing a panel 400 with a textured area 410 of hemispherical protrusions 420. FIG. 5 is an enlarged cross-sectional view of hemispherical protrusions. In these figures, the natural texture of the full-grain leather panel is shown in non-stamped area 405, with stamped area 410 being denoted by a solid border. The stamped area includes hemispherical protrusions 420. The hemispherical protrusions have an elliptical perimeter 422 at their base and a height 424. There is a space 430 between adjacent protrusions. It should be noted that a circle is a special case of an ellipse.

Figure 6:
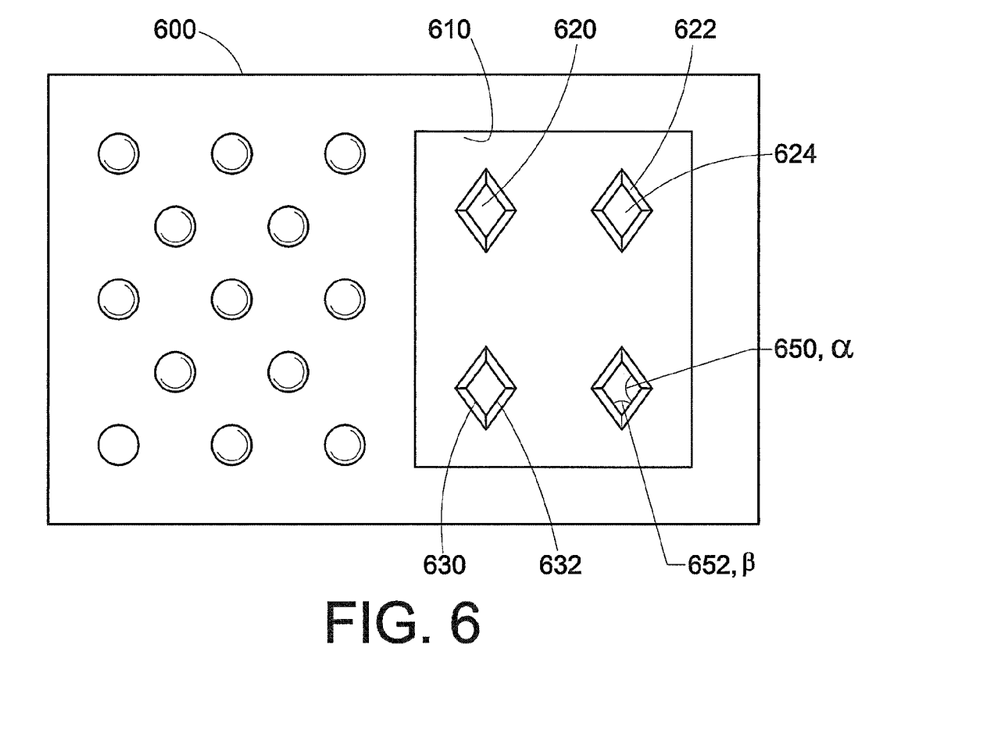
FIG. 6 is a plan view showing a leather panel with a textured area of diamond-shaped protrusions.
Figure 7:
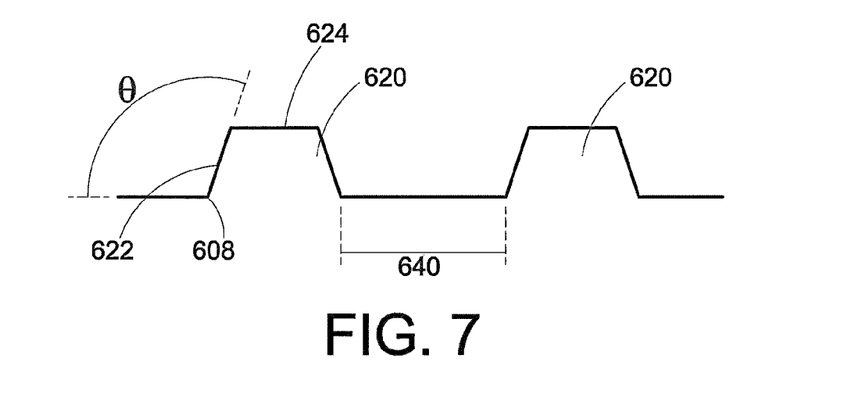
FIG. 7 is an enlarged cross-sectional view of some diamond-shaped protrusions of FIG. 6.

FIG. 6 is a plan view showing a panel 600 with a textured area 610 of diamond-shaped protrusions 620, and FIG. 7 is an enlarged cross-sectional view. This diamond protrusion 620 has four planar sides 622 and a top surface 624, and a spacing 640 is present between protrusions. The sides 622 rise at an angle θ from the base 608, and the top edges 630 of opposite sides are parallel to each other. The protrusion has four corners 650, 652 with two different plan angles α, β. The plan angles are not 90°. The top surface 624 is generally parallel to the base 608, though this is not required. It should be noted that in the cross-sectional view, the sides may appear to have a trapezoidal shape. The top edges 630, 632 of adjacent sides may differ in length.

Figure 8:
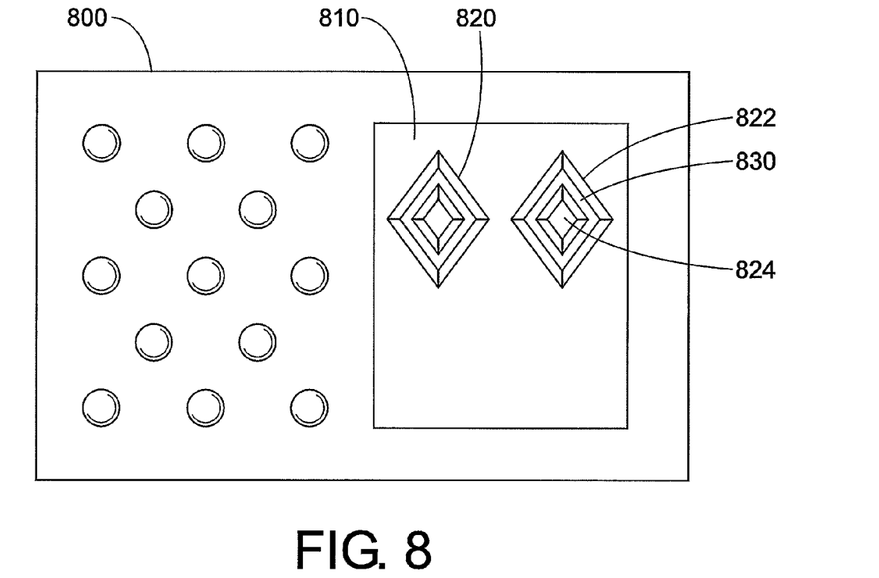
FIG. 8 is a plan view showing a leather panel with a textured area of cross hatch shaped protrusions.
Figure 9:
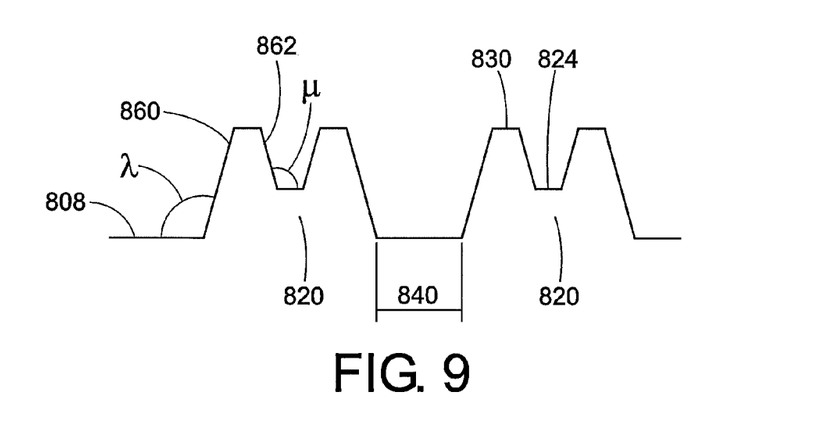
FIG. 9 is an enlarged cross-sectional view of some cross hatch shaped protrusions of FIG. 8.

FIG. 8 is a plan view showing a panel 800 with a textured area 810 of cross hatch shaped protrusions 820, and FIG. 9 is an enlarged cross-sectional view. This protrusion 820 is similar to that of a diamond-shaped protrusion as described above, but differs in that the top surface 824 is located at a lower elevation than the top edge 830 of the four sides 822. The four sides may be considered to be walls, with an exterior surface 860 and an interior surface 862. The exterior surface may have an angle λ relative to the base 808, and the interior surface may have an angle μ relative to the top surface 824. In some embodiments, the top surface is entirely missing (i.e. is at the same elevation as the base) and there is no spacing 840 between the protrusions. In such embodiments, the diamond-shaped protrusions may take the form of intersecting walls.

Figure 10:
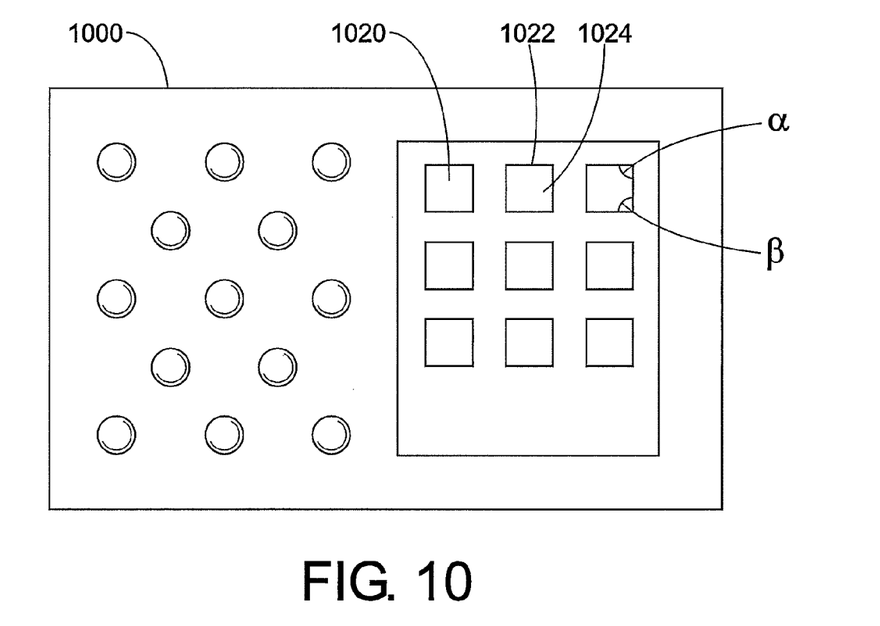
FIG. 10 is a plan view showing a leather panel with a textured area of square shaped protrusions.
Figure 11:
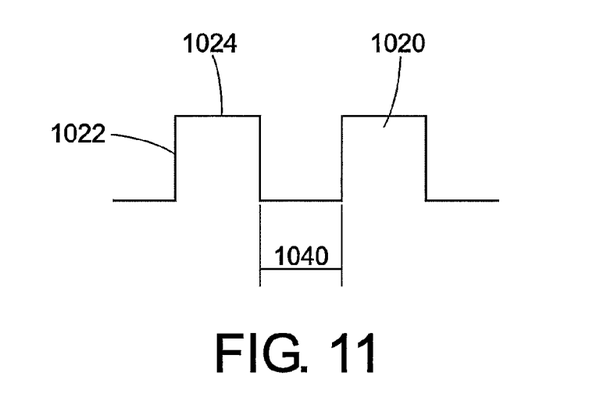
FIG. 11 is an enlarged cross-sectional view of some square shaped protrusions of FIG. 10.

FIG. 10 is a plan view of a panel 1000 with square-shaped protrusions 1020, and FIG. 11 is an enlarged cross-sectional view. Again, the protrusion has four planar sides 1022 and a top surface 1024. The four sides all have the same shape and lengths, and there is a spacing 1040 between protrusions. The plan angles α, β are 90°. The top surface is a square shape.

A graphic itself may be, for example, a logo, name, symbol, emblem, brand, sign, or other indicia that conveys information. For example, a football made for the National Football League usually contains the recognized NFL trademark. Other graphics normally seen on a game ball include the name and logo of the manufacturer, a model number, and a trademark or brand of the third-party seller. The term "graphic" is used here to denote the additional logos, names, symbols, emblems, brand markings, or signs that are added to the exterior surface of the full-grain leather panel.

A stripe is a line applied to the game ball to increase visibility or represent league affiliation. For example, white stripes on American footballs are required for "NCAA" collegiate football competition, but are not found on footballs used at the professional level National Football League ("NFL"). The stripes on "NCAA" game balls are only present on the top two leather panels. The term "stripe" or "stripes" is used here to refer to a 1-inch thick line that is added to the exterior surface of the cover panel of an American football, roughly 3 inches away from the end of the panel.

Figure 12:
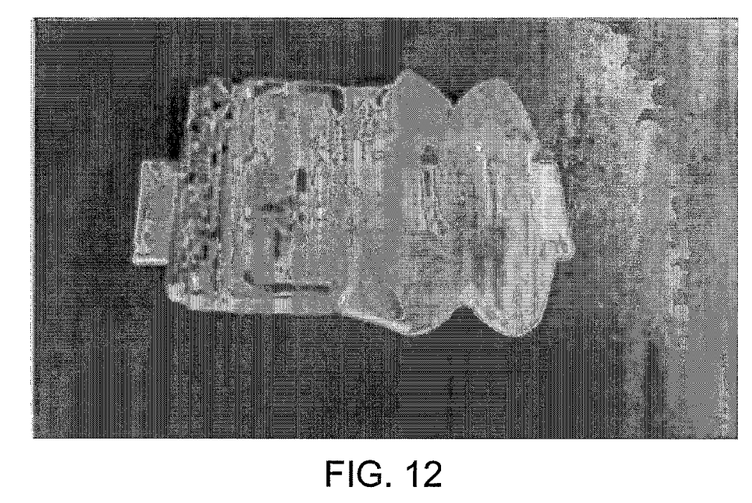
FIG. 12 is a picture of an exemplary textured stamping plate.

Once the desired texture of the stamped area has been determined, in step 304, one or more textured stamping plates are constructed. The plate(s) are made using conventional materials and methods known in the art. For example, the stamping plate may be made of copper or other suitable metal. Notably, the textured stamping plate is made so that rather than forming a flat area, a texture is formed in the stamped area. That texture arises from the protrusions described above, which are formed by the stamping plate. FIG. 12 is a picture showing an exemplary stamping plate.

Figure 13:
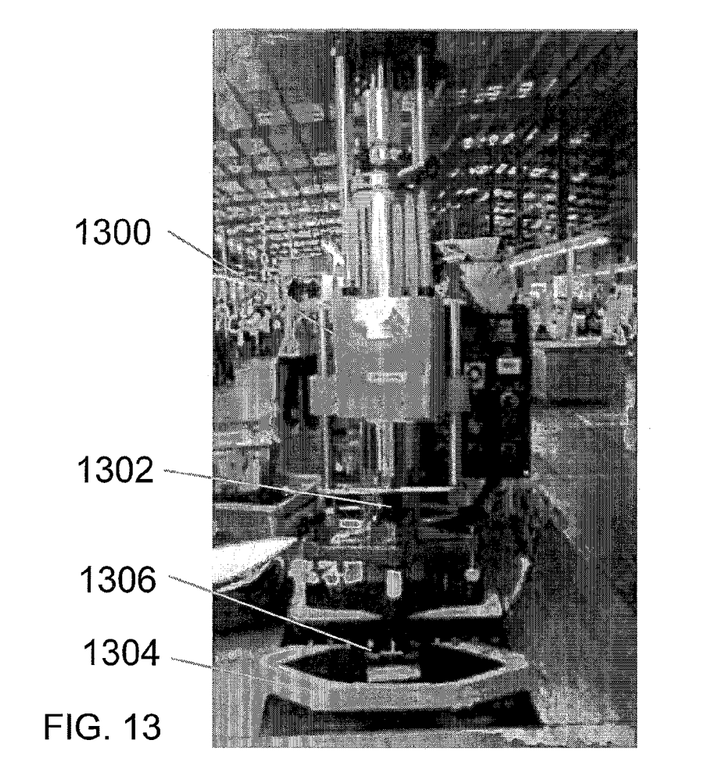
FIG. 13 is a picture of an exemplary stamping machine.

In step 306, the textured stamping plate(s) is placed into a stamping or embossing machine. FIG. 13 is a picture showing an exemplary stamping machine. The machine 1300 includes a piston 1302 and a platform 1304. The textured stamping plate 1306 is attached to the piston.

Figure 14:
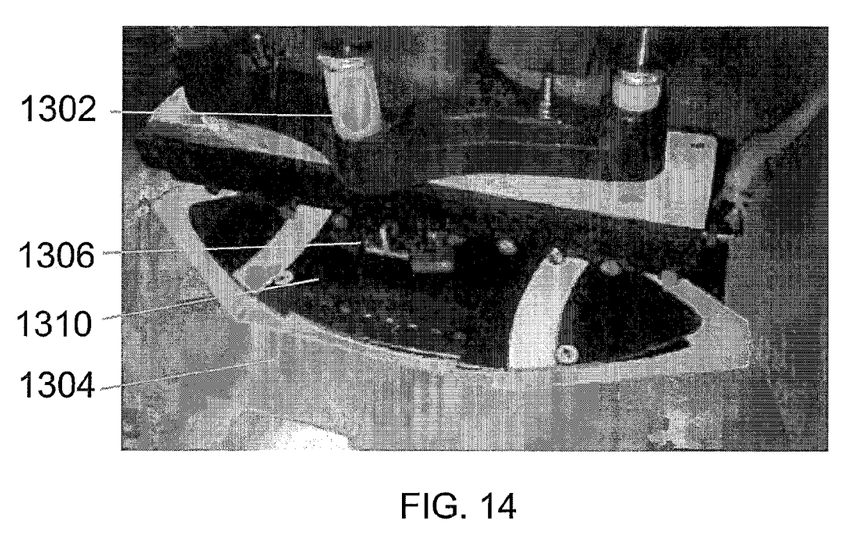
FIG. 14 is a picture showing an original full-grain leather panel placed in a stamping machine prior to being stamped to form a textured area.

In step 308, the full-grain leather panel 1310 is placed onto the platform 1304 to be stamped. FIG. 14 is a picture showing the full-grain leather panel 1310 upon the platform 1304. The piston 1302 and textured stamping plate 1306 are also visible.

Figure 15:
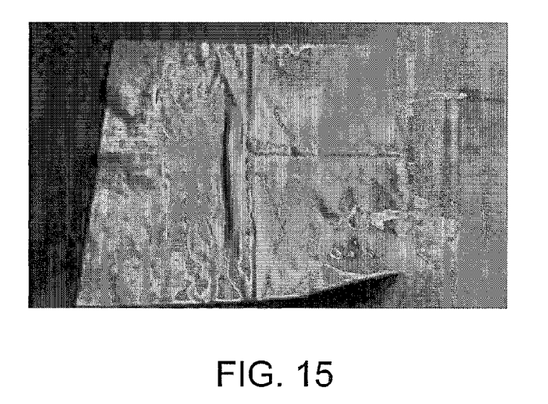
FIG. 15 is a picture of a piece of oil absorbing paper.

In step 310, an oil absorbing paper is placed over the full-grain leather panel. Put another way, the oil absorbing paper is placed between the full-grain leather panel and the textured stamping plate(s). FIG. 15 is a picture showing the oil absorbing paper.

Figure 16:
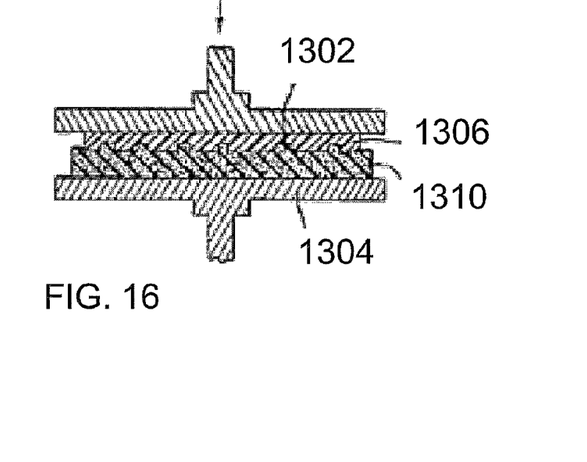
FIG. 16 is a cross-sectional depiction of the leather panel being stamped to form a textured area.
Figure 17:
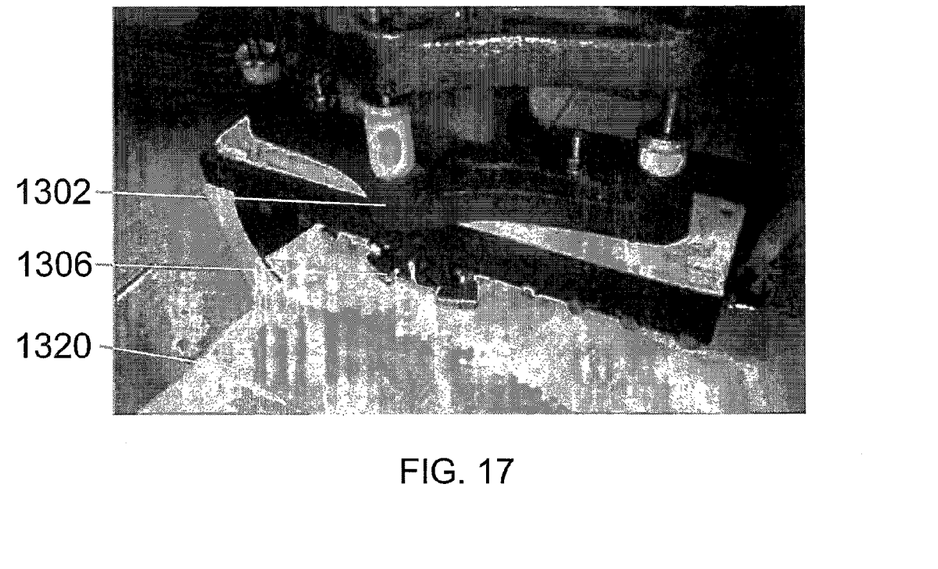
FIG. 17 is a picture showing the stamping to form a textured area.

In step 312, the full-grain leather panel is stamped with the textured stamping plate(s) to form a textured area upon the surface of the panel. The stamping machine moves the piston towards the platform to press the leather panel between the stamping plate and the platform, then withdraws. FIG. 16 is a side cross-sectional view illustrating this step. The full-grain leather panel 1310 is located on platform 1304. The piston 1302 carries textured stamping plate 1306, and presses the textured stamping plate into the leather panel. As a result, the stamped area has a textured pattern that is different from the natural texture of the full-grain leather panel outside of the stamped area. FIG. 17 is a picture showing the leather panel being stamped. The leather panel is not visible beneath the oil absorbing paper 1320, but the textured stamping plate 1306 and piston 1302 can be seen.

Figure 18:
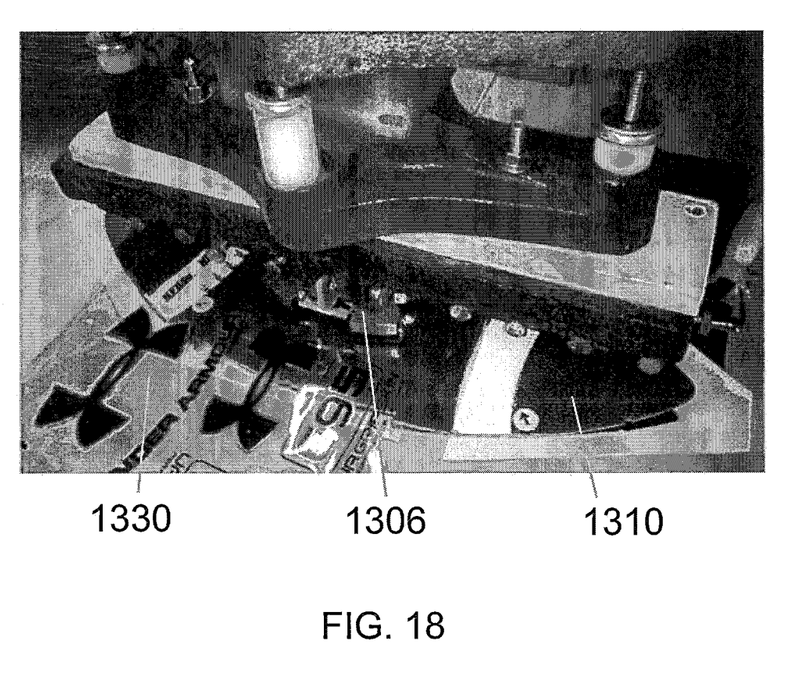
FIG. 18 is a picture showing a transfer film with graphic being applied to the textured area on the full-grain leather panel.

Next, in step 314, a transfer film is placed above the leather panel, more specifically over the textured area on the surface of the panel. The transfer film as seen in FIG. 18 is a clear transparent sheet 1330 that has the desired graphic on one side. That graphic is formed from coatings, i.e. an ink, a foil, or a paint, of the desired colors in the desired arrangement. To form a stripe, the graphic on the transfer film is generally a solid white strip.

In step 316, the graphic or stripe is applied to the textured area, resulting in a textured graphic or stripe. In FIG. 18, the textured stamping plate 1306 is pressing down on the transfer film 1330 to transfer the graphic to the textured area on the leather panel 1310. The transfer film is then removed from the textured area, leaving the graphic behind. The graphic can be applied using the same textured stamping plate as was used to create the textured area, or a different stamping plate can be used. A picture showing the resulting textured graphic is provided as FIG. 2 (previously discussed).

The method used to create a textured graphic can also be used to create a textured stripe on the full-grain leather panel.

Although described sequentially above with reference to one stamped area, several variations are contemplated. For example, multiple stamping plates may be used at one time to create multiple textured areas with one stamping action. As another example, the same stamping plate could be used to create multiple textured areas in a row, then be used to apply the graphic or stripe sequentially to each textured area. As a third example, multiple stamping plates can be used to create multiple textured areas in one stamping action, then the different graphics or stripes can be applied to the multiple textured areas using one stamping plate to apply the graphics or stripes.

Figure 19:
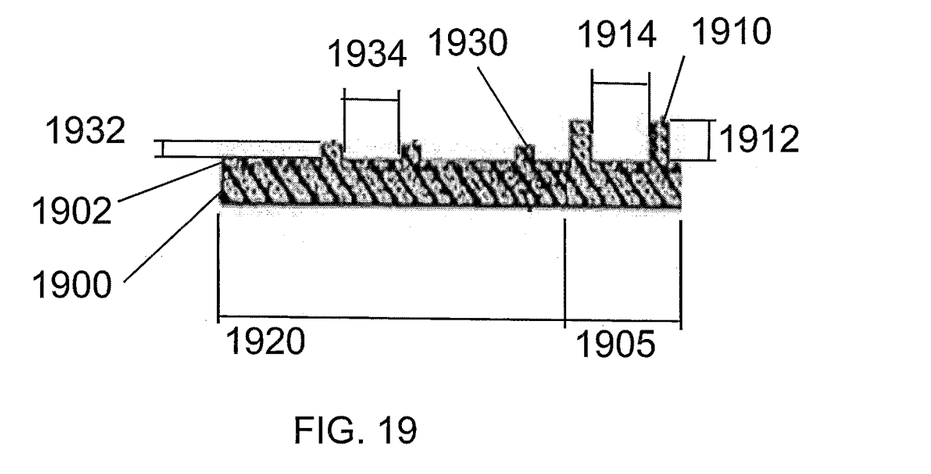
FIG. 19 is an enlarged cross-sectional view of a full-grain leather panel, showing the natural texture of the leather panel next to a stamped area having an applied texture.

FIG. 19 is an enlarged cross-sectional view of a full-grain leather panel 1900, showing the natural texture of the leather panel next to a stamped area 1920 having an applied texture. The surface 1902 of the leather panel is visible. The natural texture of the non-stamped area 1905 is depicted here with protrusions 1910 having a height 1912 and a spacing 1914, which give the full-grain leather panel its "pebbly" texture. The stamped area 1920 is depicted with protrusions 1930 having a height 1932 and a spacing 1934. The protrusions in the non-stamped area are taller (higher) than the protrusions in the stamped area. The spacing can be changed between the two areas. It should be noted that the natural texture will vary across the entirety of the surface of the full-grain leather panel. However, the difference between a stamped area and a non-stamped area is clear. Similarly, the difference in texture between the stamped area and a flat surface are clear. This new design provides improved grip, improving the overall feel and playability of game balls including such textured leather panels on their exterior surface. Put another way, the coefficient of friction is improved for the textured graphics and stripes compared to the flat/slippery graphic surfaces in conventional game balls. Similarly, the coefficient of friction is improved for textured stripes compared to the painted stripes found on conventional game balls.

It is specifically contemplated that the full-grain leather panels with a textured graphic or stripe on the surface thereof can be used to make the cover layer of a game ball, such as an American football or a rugby ball.

Figure 20:
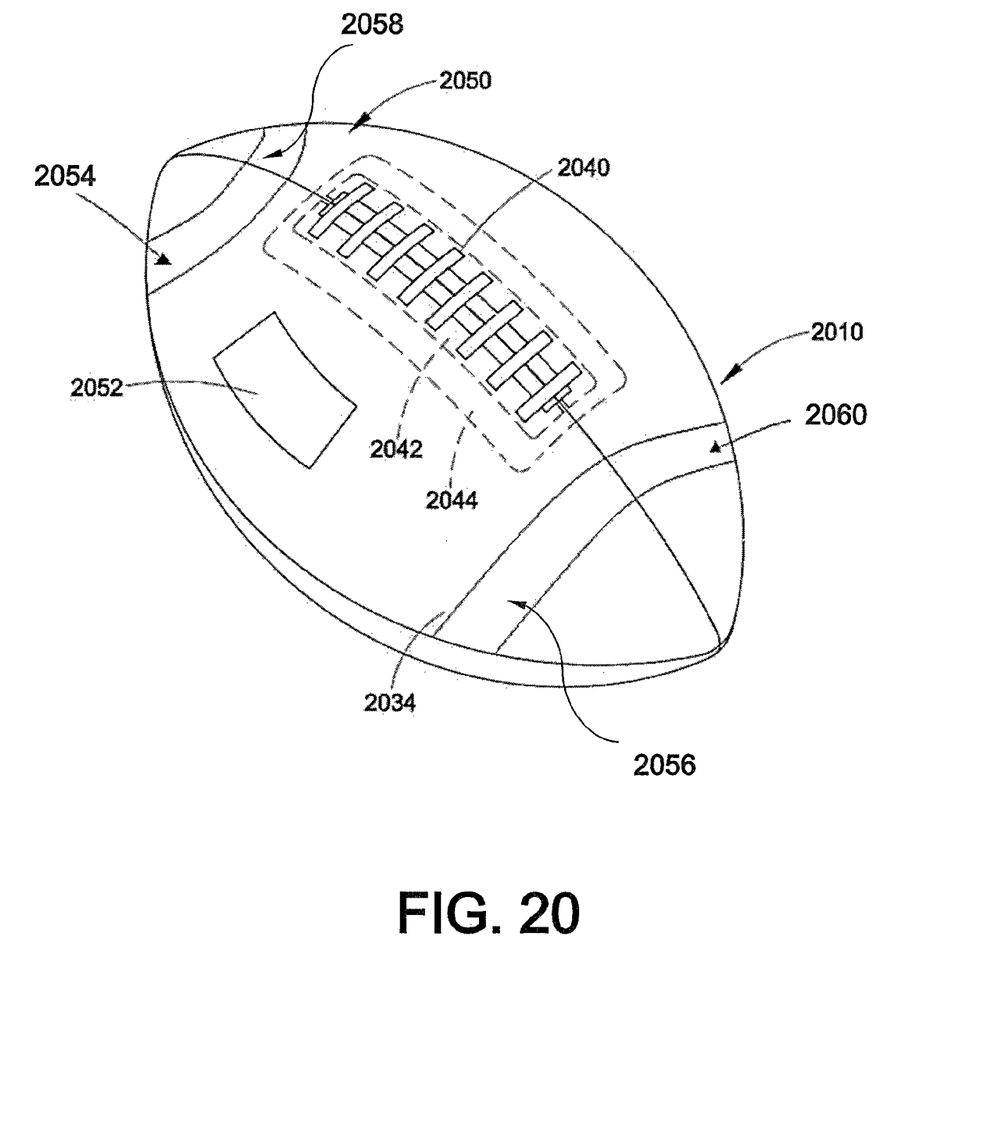
FIG. 20 is an exterior view of an American football, with which the full-grain leather panels with textured graphics or stripes can be used.
Figure 21:
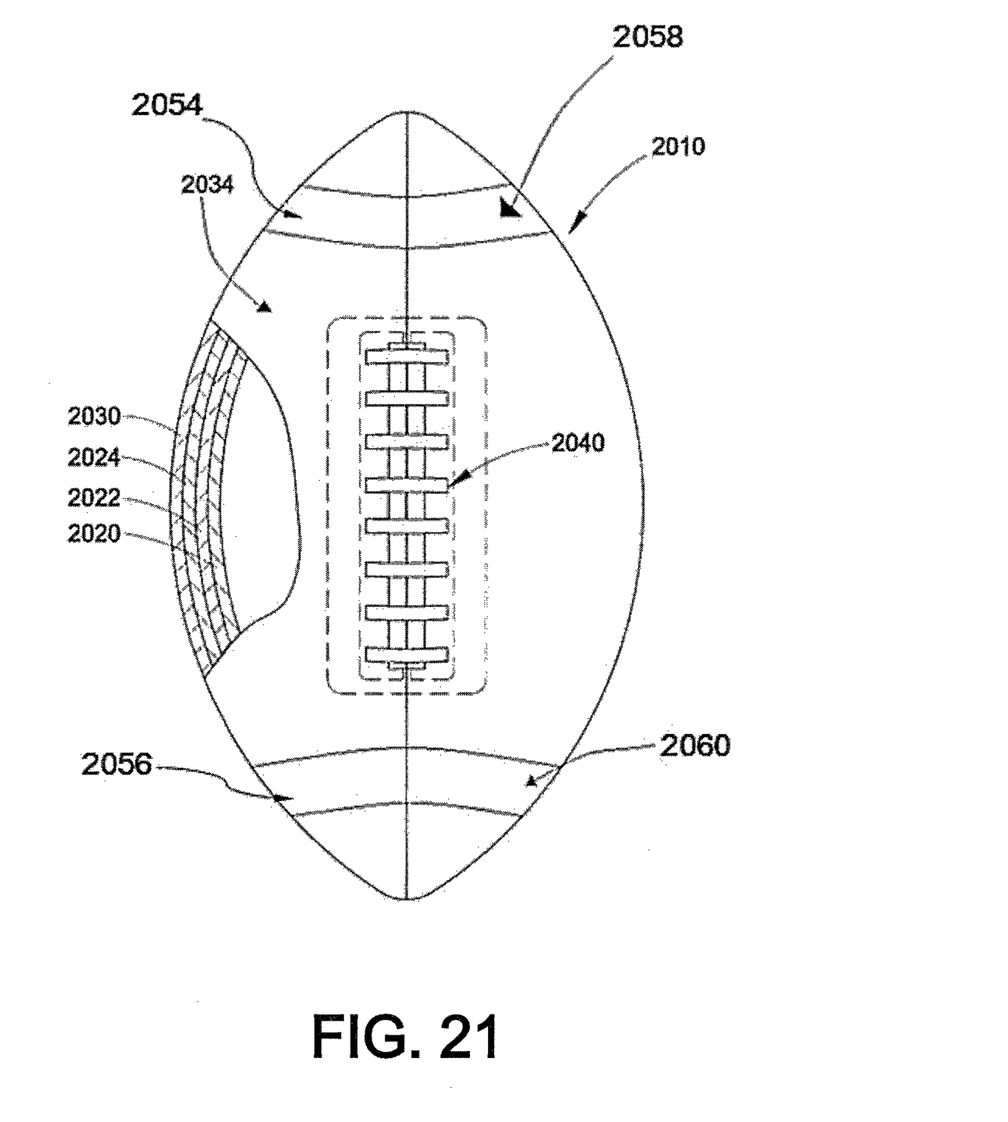
FIG. 21 is a cross-sectional view of the football of FIG. 20.

FIG. 20 is an exterior view of a American football with a textured graphic and/or textured stripes. FIG. 21 is a cross-sectional view of the same football 2010. The full-grain leather panels 2050 make up the exterior surface of the football, and form a cover layer 2030. Inside the football is a bladder 2020. Surrounding the bladder 2020 is a cloth liner 2022, then a foam liner 2024, then the cover layer 2030. The cloth liner, foam liner, and cover layer are generally made in multiple pieces that are combined to make a panel 2034; four panels 2034 are used to cover the football 2010. The four panels are joined together by stitching at three edges and by a combination of stitching and lacing at the fourth edge. The lacing area includes the lacing 2040, a patch material 2042 stitched to the underside of panels 2034 through which lacing 2040 penetrates, and a tongue 2044 located between the bladder 2020 and the lacing 2040 which has penetrated the patch material 2042. It should be understood that the "top" of the ball is comprised of the two panels adjacent the lacing 2040. These two panels include stripes 2054, 2056, 2058, and 2060.

The textured graphic 2052 is shown here as a simple rectangle, which should be understood as representing a textured area with an applied graphic, and as being a picture or text. The stripes 2054, 2056, 2058, and 2060 are present on the top two panels 2034, and are textured. The textured stripes 2054, 2056, 2058, and 2060 are shown here as simple curved lines, which should be understood as representing a textured area with applied stripes.

Figure 22:
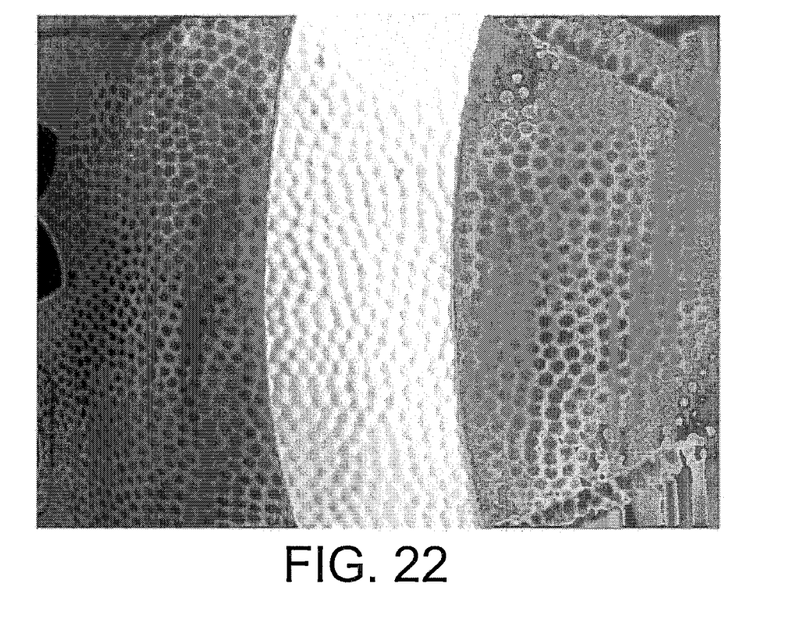
FIG. 22 is a picture showing a leather panel with a stripe prepared according to conventional methods and having a slippery surface.
Figure 23:
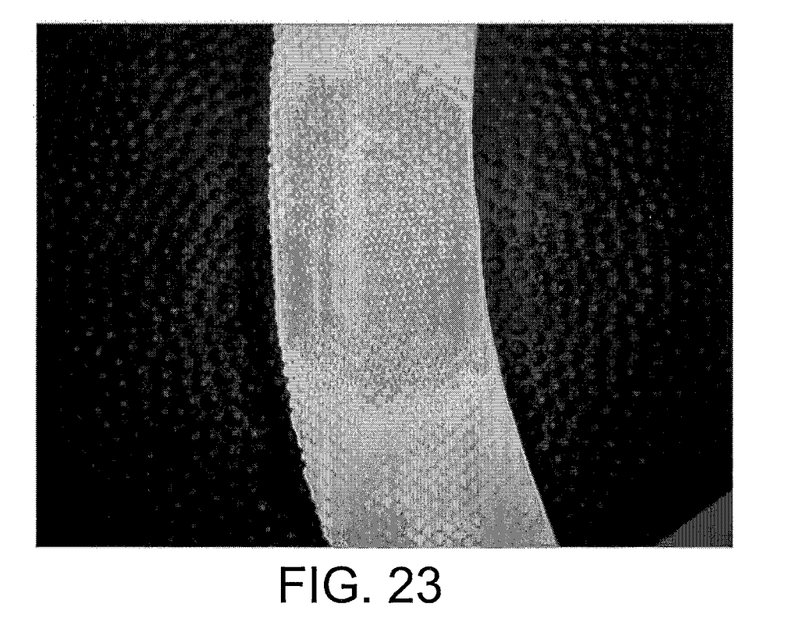
FIG. 23 is a picture showing a leather panel with a textured stripe prepared according to the present disclosure and having a textured surface with enhanced durability and good grip properties.

FIG. 22 is a panel with a stripe applied using conventional methods, while FIG. 23 is a panel with a textured stripe applied using the methods of the present disclosure. In FIG. 22, the stripe has the same "pebbly" texture as the outer surface of the natural full-grain leather panel to either side of the stripe. In FIG. 23, the protrusions in the textured stripe create a textured pattern with better durability and grip characteristics. There is a clear difference between this textured pattern and the natural texture of the outer surface of the full-grain leather panel that has not been processed using the methods of the present disclosure.

As described above, the textured stamping plate is first applied to the full-grain leather panel to form a textured area, and the graphic/stripe is subsequently applied to the textured area to obtain a textured graphic/stripe. These steps could also be reversed. The graphic/strip could be applied to the full-grain leather panel first to form a graphics area, and this graphics area could subsequently be stamped with the textured stamping plate to obtain the textured graphic/stripe.

The methods, game balls, and devices of the present disclosure have been described with reference to exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A method for applying a textured graphic or stripe upon a panel of full-grain leather, comprising:
   stamping the full-grain leather panel with a textured stamping plate to form a textured area on the leather panel;
   placing a transfer film over the textured area, the transfer film having a graphic or stripe; and applying the graphic or stripe into the stamped area with the textured stamping plate to form the textured graphic or stripe.

2. The method of claim 1, further comprising placing an oil absorbing paper between the textured stamping plate and the full-grain leather panel prior to stamping.

3. The method of claim 1, wherein the textured area after stamping has a textured pattern that is different from the natural texture of the full-grain leather panel outside the textured area.

4. The method of claim 1, wherein the textured area is formed from protrusions having a shape selected from the group consisting of a rounded hemisphere, diamond, square, cross hatch pattern, or combinations thereof; or wherein the textured area is a customized shape.

5. The method of claim 1, wherein the graphic or stripe on the transfer film comprises an ink, foil, or paint.

6. The method of claim 1, wherein the graphic is a logo, name, symbol, emblem, brand, or sign.

7. The method of claim 4, wherein the textured area is a customized shape, and is a team or brand logo.

\* \* \* \* \*